T. G. STILES.
BATTERY ELEVATOR.
APPLICATION FILED AUG. 14, 1914.
1,244,558.
Patented Oct. 30, 1917.
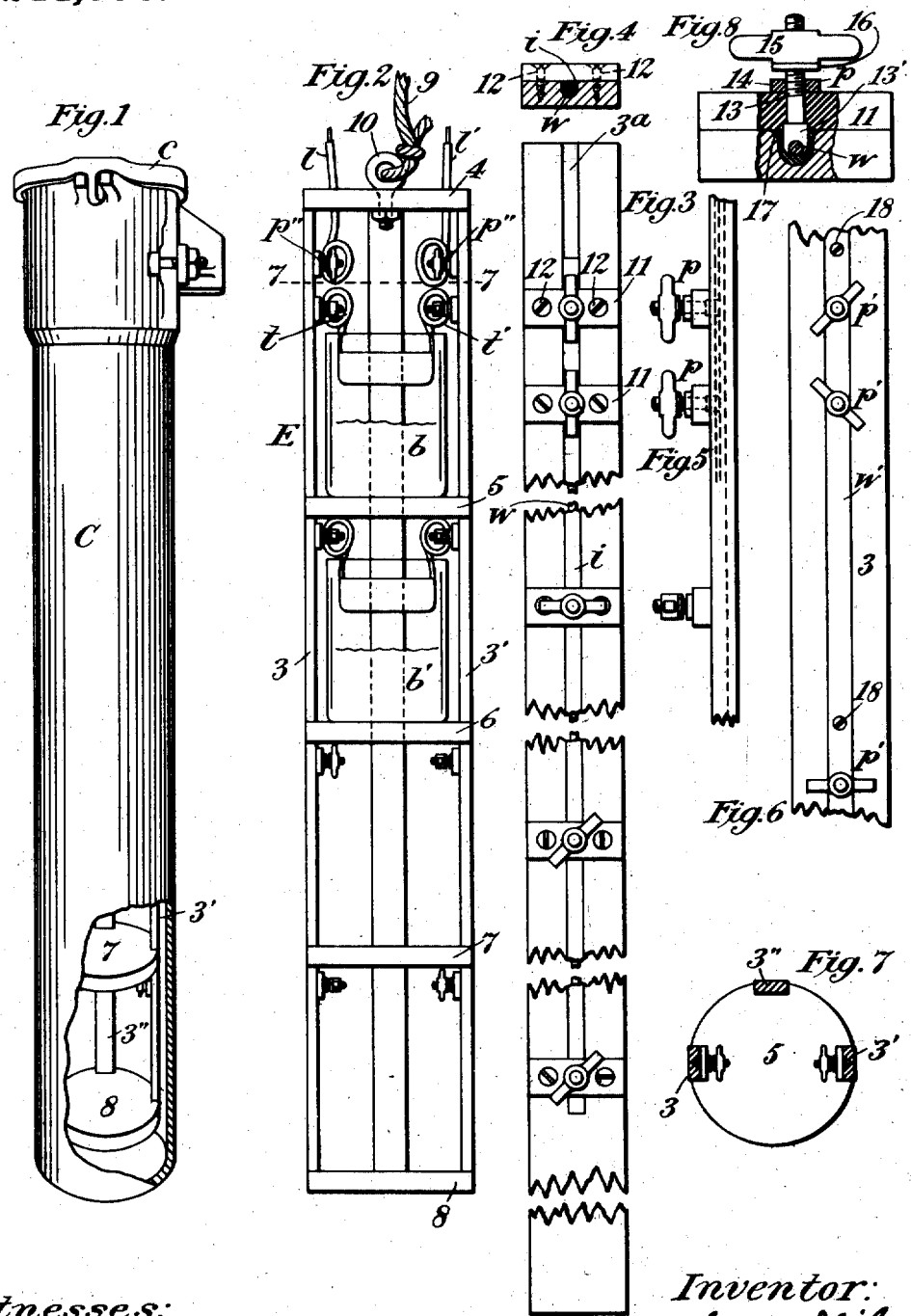
Witnesses:
Chas. W. King
John A. Jones
Inventor:
Thomas George Stiles,
by
Attorney.

UNITED STATES PATENT OFFICE.

THOMAS GEORGE STILES, OF ARLINGTON, NEW JERSEY.

BATTERY-ELEVATOR.

1,244,558.   Specification of Letters Patent.   Patented Oct. 30, 1917.

Application filed August 14, 1914. Serial No. 856,764.

*To all whom it may concern:*

Be it known that I, THOMAS GEORGE STILES, a citizen of the United States, and a resident of Arlington, in the county of Hudson and State of New Jersey, have invented certain new and useful Improvements in Battery-Elevators, of which the following is a specification.

In railway signal work, as is well known, it is customary to support the batteries in suitable containers, such as battery elevators, placed in casings known as battery chutes. In these battery elevators the batteries are mounted on shelves one above another and so connected that heretofore it has been impossible to get at one of the batteries on one of said shelves and disconnect it and substitute a new cell for the exhausted one without at the same time interfering with the electrical connections to the other cells. The inspection of these batteries and the replacement thereof has also in practice taken a great deal of time.

The principal object of the present invention is to avoid these disadvantages connected with the construction and use of battery container or elevators as heretofore employed; to make it easy to connect or disconnect any battery and substitute another therefor without interfering in any way with the electrical connections of any other battery in the elevator, and to reduce to the minimum the amount of time required for connecting and disconnecting, etc.

In carrying my invention into effect I employ on a battery container or elevator of any suitable type one or more common or bus-conductors having means for detachably engaging a terminal conductor or conductors of each battery container in the elevator, the usual construction employed by me being one in which two conductors common to all the batteries in the elevator carry pairs of binding-posts with which connection in parallel may be quickly made to each of the batteries or cells on the shelves of the elevator, and as quickly interrupted without the slightest interference with the electrical connections of any other cell in the elevator.

Other features of my present invention not hereinbefore referred to will be hereinafter described and claimed and are illustrated in the accompanying drawings, in which—

Figure 1 is a perspective, with the casing partly broken to show the interior construction, of a battery chute and elevator illustrating this invention;

Fig. 2 is an elevation, on an enlarged scale, of my improved battery elevator showing a plurality of cells electrically connected with the common conductors of the elevator;

Fig. 3 is a similar view, further enlarged and broken at various points, of one of the side-pieces of the elevator looking at the inner face thereof, and illustrates the manner in which a common conductor for all of the batteries of the elevator is applied to one of said side-pieces and also shows the manner in which electrical connection from said common conductor to the various batteries may be made;

Fig. 4 is a horizontal section of said side-piece with its common conductor and binding-posts, the section being taken through one of these binding-posts;

Fig. 5 is an edge elevation of the side-piece and other parts shown in Fig. 3;

Fig. 6 is a view similar to Fig. 3 of a portion of one of the side-pieces of the elevator illustrating a modification of the invention in which a bus-bar, usually of copper, is employed as a common conductor for connection to the track batteries instead of the covered conducting wire shown in Figs. 3 and 4;

Fig. 7 is a horizontal section of the battery elevator, the section being taken in line 7—7, Fig. 2, and Fig. 8 is a sectional detail much enlarged showing the manner in which electrical connection is made between each binding-post and the wire of a covered conductor, and also shows how these parts are insulated after electrical connection is made.

Similar characters designate like parts in all the figures of the drawings.

C designates a battery chute of well-known construction having a suitable cover, c, in which chute the battery elevator and batteries are located. E designates generally a battery elevator which in most respects may also be of well-known construction, it having the usual side-pieces, 3, 3' and 3'', secured to a series of partitions or shelves, such as 4, 5, 6, 7 and 8, the first and last of which constitute the top and bottom of the elevator and the last four of which serve as shelves on which the batteries or cells are supported. The elevator is raised or lowered ordinarily by a rope, 9, connected to an eye, 10, secured to the top piece 4 of the elevator. Two batteries or cells are illustrated at $b$ and $b'$ on the shelves 5 and 6 of said elevator. It will be understood, of course, that the shelves 7 and 8 will also ordinarily carry similar batteries.

For the purpose of making electrical connection with the terminals of the batteries without disturbing any other battery when one is being connected or disconnected, I employ one or more common conductors extending lengthwise of the elevator and preferably secured to the side-pieces thereof such as 3 and 3'. Each of these side-pieces is illustrated as having a central, vertical groove, such as $3^a$, for the reception of such a common conductor, and the common conductor employed in the apparatus illustrated in the main views is an insulated or covered wire, the metallic portion of which is illustrated at $w$ and the insulation at $i$. Two common conductors are shown for connection to the opposite terminals of the respective batteries $b$, $b'$, etc. Each of these common conductors is preferably brought into electrical connection with a terminal or terminals of one or more batteries by detachable connections, the preferred means employed being suitable binding-posts secured to the common conductors. In the main views each of the insulated wires is held in place in its channel in the side-piece of the elevator by cleats, such as 11, preferably insulating cleats of fiber, secured in place by suitable means, such as screws 12, and these cleats also serve as means for supporting and insulating the binding-posts, designated generally by $p$. The construction of the binding-posts may be any suitable for the purpose, but in connection with an insulated conductor such as shown I prefer to employ a screw, such as 13, threaded at its upper end and having a smooth intermediate shank with an enlarged bifurcated head, such as 13', forked to straddle a bared portion of the wire $w$. The shoulder between the enlarged head 13' and the shank of the screw is seated in a countersunk or undercut opening in the inner face of a cleat 11 and is thus prevented from being pulled out. A metallic nut is shown at 14 (see Fig. 8) for holding the screw 13 firmly in place and also provides a wide contact surface for the electrical connection. A wingnut, such as 15, and preferably a loose washer, 16, between which and the nut 14 a terminal conductor of a cell may be clamped, complete in this construction each individual binding-post. After each common conductor is in place and the screw-post 13 is properly located, as just described, the remaining space resulting from the removal of the insulation from the wire $w$ to permit contact with the head 13' is preferably filled in by flowing insulating cement all around the joint and in the groove $3^a$ adjacent to the joint, as shown at 17. The wood-work and cleats are then usually coated with insulating paint.

In the modification shown in Fig. 6 the common conductor instead of being an insulated wire is a bus-bar, preferably of copper, and is designated by $w'$. It usually fills a substantially rectangular and relatively shallow groove in the side-piece 3 (or 3') so as to be substantially flush with the inner surface of the part 3 and may be secured in place by any suitable means, such as the screws 18. The binding-posts, designated generally by $p'$, employed in connection with this bus-bar are secured directly to it and are substantially similar to the binding-posts $p$, except that the screw-post is screwed directly into the bus-bar. This construction is obviously somewhat simpler than that first described. When the binding-posts are in place the bus-bar and the wood side-piece are also preferably covered with a coating of insulating paint.

The manner in which the individual batteries or cells $b$, $b'$, etc., coöperate with a pair of parallel common conductors of the kind just described will be evident by referring to Fig. 2, from which it will be seen that opposite terminals of each battery are connected to binding-posts carried by common conductors at opposite sides of the elevator. Any battery may be disconnected electrically by simply loosening the wing-nuts of the two binding-posts to which it is connected and then withdrawing its terminal conductors $t$ and $t'$ from said binding-posts, and then removed from its shelf without interfering in any manner whatsoever with the electrical connections to any other cell. Because of the parallel connections of the respective batteries in the track-circuit as a result of the use of common conductors as described, it will be plain that on withdrawing the elevator from the battery chute it will be the work of only a few moments to disconnect any cell and insert a new one and restore the electrical connections at the points of interruption without any disturbance of such other cells.

The conductors of the track-circuit may be connected to the conductors common to the batteries in substantially the same manner as just described, that is, by connecting the terminals $l$ and $l'$ of the track-circuit to binding-posts $p''$ secured to the two common conductors on the elevator.

What I claim is:

1. A battery elevator, embodying a side-piece having at its inner face a longitudinal groove for receiving a conductor, a common conductor for the batteries which conductor is seated in said groove, and a plurality of binding-posts secured to said common conductor at different points in the length thereof and in position for electrical connection with terminals of different batteries carried by said elevator.

2. A battery elevator, embodying a pair of side-pieces each having at its inner face a longitudinal groove for receiving a conductor, a pair of common conductors for the batteries said conductors being seated respectively in said grooves, and a plurality of pairs of binding-posts secured to said common conductors at different points in the lengths thereof and in position for parallel connection in pairs with opposite terminals of different batteries carried by said elevator.

3. A battery elevator, comprising a plurality of shelves, side pieces secured to and extending between the same, common conductors for the batteries embedded in said side pieces and binding posts extending from the conductors above each of the shelves.

4. A battery elevator, comprising a plurality of shelves, side pieces extending between and connected to the shelves, bus conductors embedded in the side pieces, binding posts connected to and extending inwardly from the bus conductors above certain of the shelves, and a pair of binding posts adjacent to the upper ends of the conductors adapted to receive the terminals of the track circuit.

Signed at New York in the county of New York and State of New York this 11th day of August, A. D. 1914.

THOMAS GEORGE STILES.

Witnesses:
JOHN A. JONES,
C. S. CHAMPION.

Copies of this patent may be obtained for five cents each, by addressing the "Commissioner of Patents, Washington, D. C."